Aug. 21, 1962 H. WEIBEL 3,049,737
ADJUSTABLE CENTERING WORKHOLDER
Filed July 31, 1957 3 Sheets-Sheet 1

INVENTOR.
HERMAN WEIBEL
BY
*J. W. Douglas*
His atty

Aug. 21, 1962  H. WEIBEL  3,049,737
ADJUSTABLE CENTERING WORKHOLDER
Filed July 31, 1957  3 Sheets-Sheet 2
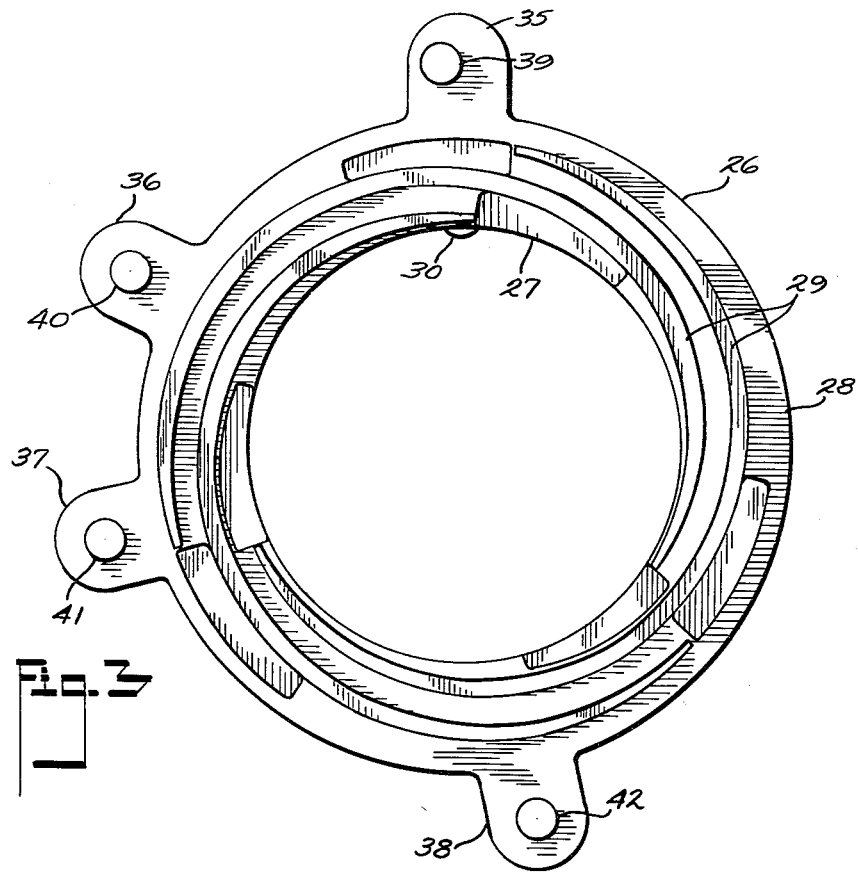
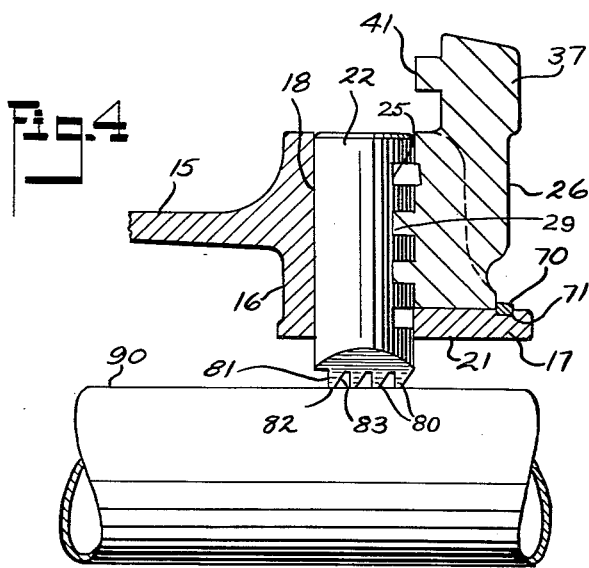
INVENTOR.
HERMAN WEIBEL
BY
J. U. Douglas
His Atty

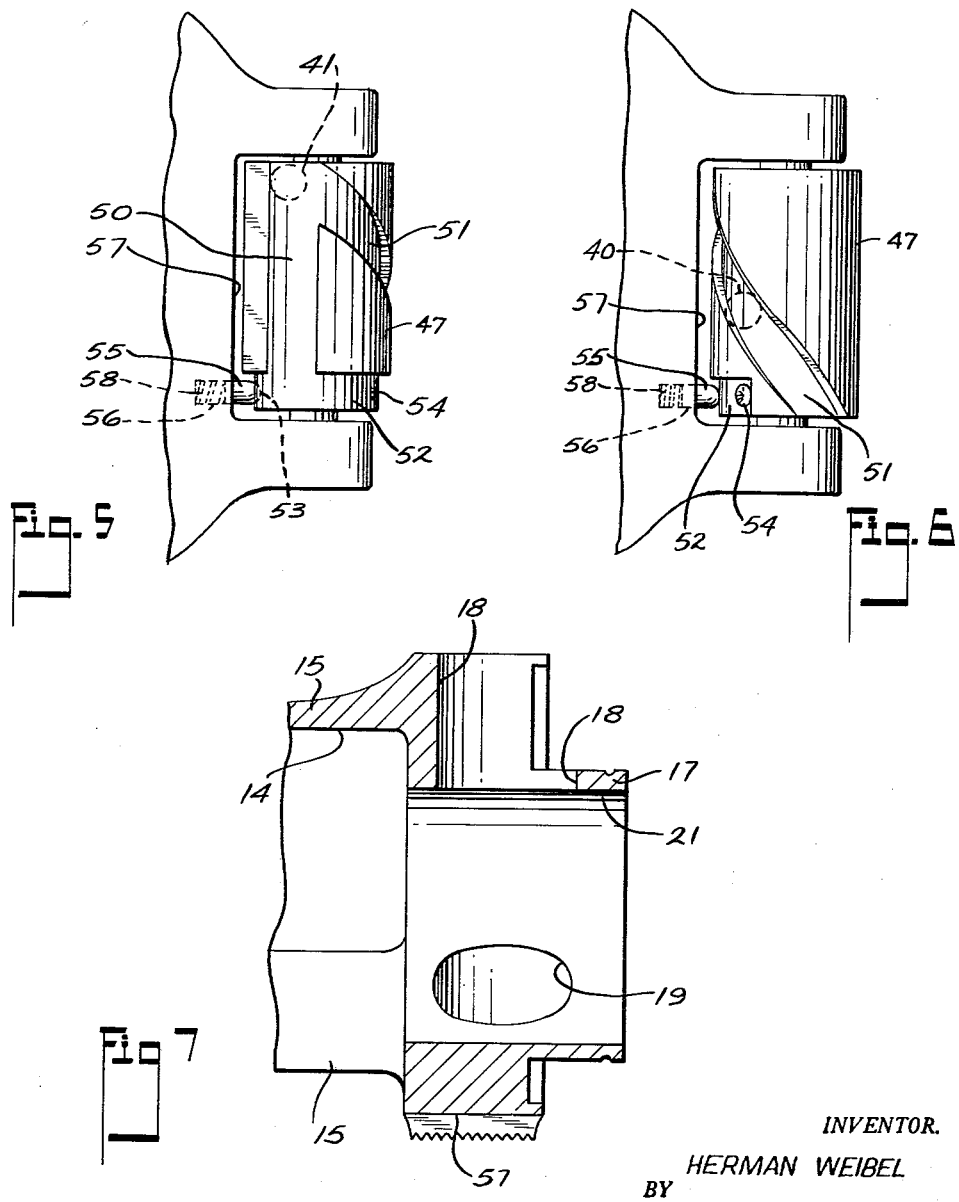

United States Patent Office 3,049,737
Patented Aug. 21, 1962

3,049,737
ADJUSTABLE CENTERING WORKHOLDER
Herman Weibel, Westlake, Ohio, assignor to The
Ridge Tool Company, Elyria, Ohio
Filed July 31, 1957, Ser. No. 675,390
17 Claims. (Cl. 10—107)

This invention relates generally to an adjustable centering workholder, and particularly to such a workholder for use in conjunction with a pipe thread cutting mechanism.

Pipe threading mechanisms, such as of the type shown in United States Letters Patent No. 2,680,961, for example, require a workholder for securely holding the pipe on which the threads are being cut. A workholder for this general purpose which has proved highly advantageous in practical use is disclosed in United States Letters Patent No. 1,973,232. The workholder of this latter patent is provided with a pair of jaws which are adjustable radially toward and away from the pipe. An index ring is cooperably associated with these jaws, such that by turning the index ring the jaws can be adjusted radially in or out to accommodate different sized pipes, such as 1 inch, 1¼ inch and 2 inch pipes. A detent mechanism is provided for releasably locking the index ring at each of several angular positions, corresponding to the various standard sizes of pipes to be accommodated. A third jaw, which is manually operable independent of the index ring, is threadedly mounted on the workholder for radial adjustment to clamp the pipe tightly against the pair of jaws which have been moved into position by the index ring.

While this workholder has been found to be generally well suited for its intended purposes, some difficulty was encountered in using it when the pipe to be threaded was appreciably oversized or under-sized with respect to its nominal size. In such event, the workholder tends to position the pipe somewhat off-center, with the result that the associated threading mechanism does not cut parallel to axis of pipe and hence does not cut perfect threads.

The present invention is directed to a workholder which is intended for the same general purpose, but which avoids the disadvantages associated with the previous workholder.

Accordingly, it is an object of the present invention to provide a novel and improved workholder.

It is also an object of this invention to provide a novel centering workholder which is particularly adapted for use in conjunction with a pipe threader and which has novel provision for securely holding in centered position pipes of various sizes, including pipes which are oversized or under-sized with respect to their nominal sizes.

Other and further objects and advantages of the present invention will be apparent from the following detailed description of a preferred embodiment thereof, which is illustrated in the accompanying drawings.

In the drawings:

FIGURE 3 is an end view of the index ring, taken from its inner end;

FIGURE 4 is a fragmentary sectional view showing one of the adjustable jaws in the present workholder engaging the pipe which is to be threaded;

FIGURE 5 is a fragmentary elevational view showing the adjusting cam in its normal position in the present workholder;

FIGURE 6 is a similar view showing the adjusting cam in a different position; and FIGURE 7 is a fragmentary section centrally through the workholder body with the clamping jaws removed, taken along the line 7—7 in FIG. 2.

Figure 1:
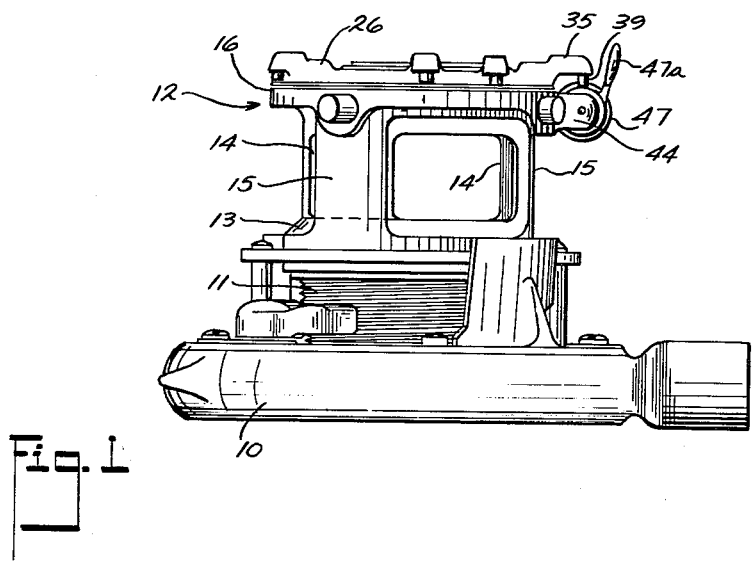
FIGURE 1 is an elevational view, on a reduced scale, of a pipe threader with the present workholder mounted thereon.

Referring first to FIGURE 1, the present workholder is particularly adapted for use on a pipe threader which comprises a chaser holder 10 in which are positioned a plurality of chasers, not shown, for engagement with the pipe to cut threads thereon in the usual manner. The chaser holder carries an axially projecting, annular, externally threaded barrel 11 upon which the present workholder is mounted. Desirably, the pipe threader per se may be constructed as shown in U.S. Patent 2,680,861, to which reference may be made for a detailed description of its construction and mode of operation.

The present workholder comprises a base or body member 12 having an internally threaded annular inner end 13 which threadedly engages the barrel 11 on the chaser holder. Between its ends the workholder is cut away to provide openings 14 separate by longitudinal ribs 15. At its outer end 16 the base 12 of the workholder is annular.

Figure 2:
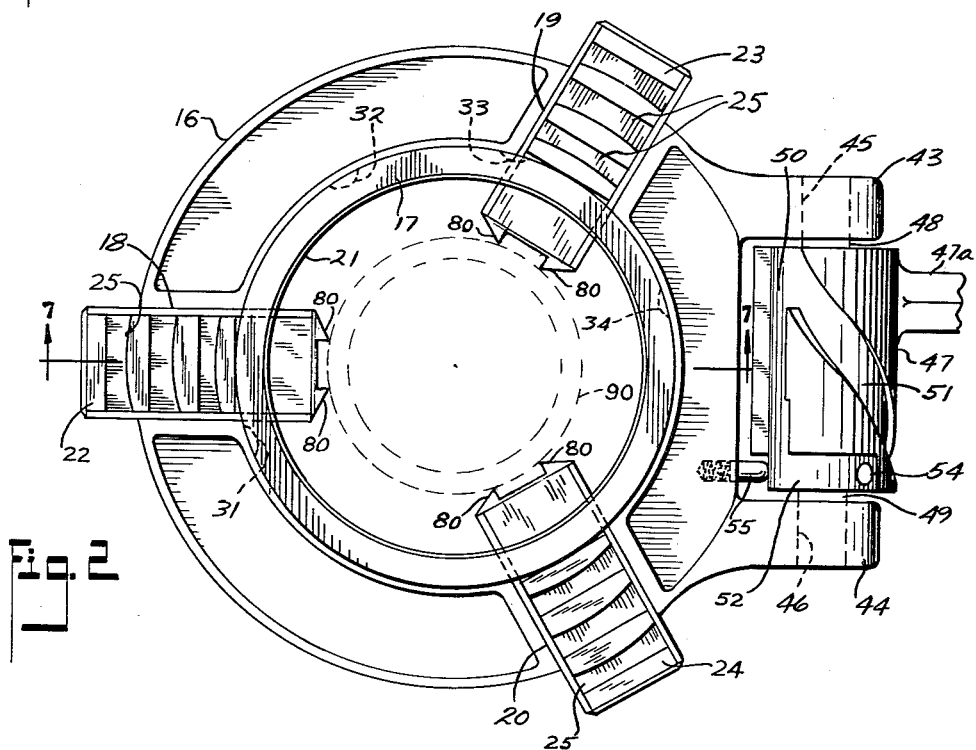
FIGURE 2 is an end view, on a larger scale, of the present workholder with the index ring removed and with the pipe shown in dashed lines.

The outer end of the base is formed with a centrally disposed, integral, cylindrical, axially projecting boss or collar 17 (FIGS. 2, 4 and 7). Three radial passages 18, 19 and 20 (FIG. 2) are formed in the outer end 16 of the body. These passages are open at the front throughout their respective extents radially outward from the central cylindrical boss 17. They lead into the central axial passage 21 defined by the inner wall of boss 17.

Slidably mounted in the radial passages 18–20 are pipe-gripping jaws 22, 23 and 24, respectively. Each of these jaws is flattened at its front face and is formed thereat with a plurality of radially spaced, spiral groove portions 25.

As shown in FIGS. 2 and 4, the radially inner end of each jaw is formed with spaced sets of teeth 80 at its opposite sides for engagement with the pipe. Referring to FIG. 4, each of these teeth has an axially inner face 81 which extends substantially perpendicular to the axis of the pipe 90, a substantially pointed, pipe-engaging edge 82 which extends a short distance lengthwise of the pipe, and an inclined axially outer face 83 which inclines radially and axially outward away from the pipe-engaging edge 82. From FIG. 2 it will be apparent that the spaced sets of teeth 80 on each jaw are substantially triangular in transverse section and engage the pipe 90 at their substantially pointed edges 82 at spaced points around the circumference of the pipe. Each of these jaw teeth has an essentially line contact with the pipe. The net result of this jaw construction is that the jaws more securely grip the pipe and prevent it from turning in the workholder. The slant of the teeth is such as to hold the pipe against longitudinal movement due to the pressure exerted by the chasers during the thread cutting operation.

An index ring 26 is rotatably mounted on the forwardly projecting central boss 17 on the body 12 of the workholder. This index ring (FIG. 3) is formed with a central circular axial opening 27 which snugly, but rotatably, receives the boss 17 on the workholder body. At its axially inner face 28 the index ring is formed with a plurality of spiral lands 29 for engagement in the spiral groove portions 25 on the gripping jaws 22–24. Thus, by turning the index ring 26 with respect to the workholder body 12 the spiral lands 29 on the index ring position the gripping jaws 22–24 radially inward or outward to settings corresponding to the angular setting of the index ring.

A snap ring 70 (FIG. 4) is seated in an annular groove 71 formed on the outer periphery of boss 17 adjacent its forward end. This snap ring engages the outer, or front, face of the index ring 26 to retain the index ring on the workholder base 12.

The index ring carries a spring-pressed ball 30 (FIG. 3) which is biased by a spring (not shown) to a position in which it projects radially inward slightly beyond the internal side wall of the index ring which defines the central opening 27 therein. The central cylindrical boss 17 on the body 12 of the workholder is formed with four shallow recesses 31–34 (FIG. 2) which are open at the outer cylindrical peripheral wall of this boss. The ball 30 is adapted to project into one or the other of these openings to releasably lock the index ring at a predetermined angular setting. Depending upon its angular setting, the index ring positions the clamping jaws to grip a pipe or other work piece of 1 inch, 1¼ inch, 1½ inch or 2 inch diameter, due to this ball-and-socket detent arrangement. It should be noted that the detent setting positions the jaws such that they are slightly outward of the periphery of the largest of each size of pipe so that the apparatus may be easily slid over the pipe both when putting on or taking off the device before or after a thread cutting operation.

The index ring is formed with four radially outwardly extending arms 35, 36, 37 and 38. These arms carry axially inwardly projecting pins 39, 40, 41 and 42 respectively, on their inner faces. On their outer faces they carry the indicia "1," "1¼," "1½" and "2," respectively, to indicate the settings for the corresponding sized pipe.

In accordance with the present invention the workholder is provided with an adjusting cam for cooperation with the index ring to hold the index ring at any desired location between its four detent positions. This is for the purpose of holding the pipe gripping jaws 22–24 at any desired position between the settings for either 1 inch, 1¼ inch, 1½ inch or 2 inch pipe in case the pipe varies from its nominal size.

To this end the outer end 16 of the workholder body 12 is formed with a pair of integral ears 43 and 44 (FIG. 2), which have openings 45 and 46 aligned along an axis which is perpendicular to the central axis of the axial opening in the workholder. A rotatable cam 47 is carried by trunnions 48 and 49, which are rotatably mounted in the openings 45 and 46 in the ears 43 and 44. The cam 47 is provided with an integral handle 47a.

The cam 47 has a generally cylindrical periphery. A relatively wide, straight groove 50 in the cam periphery extends lengthwise of the cam from one end to the other. A narrower cam groove 51 intersects one end of the straight groove 50 and curves around the periphery of the cam and terminates at the opposite axial end of the cam about 180° around the cam from the straight slot 50. A circular groove 52 in the cam periphery at said opposite axial end of the cam extends from a position to one side of the straight groove 50, across the straight slot and around the periphery of the cam to a position just short of the cam groove 51.

At opposite ends of groove 52 the cam 47 is formed with shallow recesses 53 and 54. A spring-pressed plunger 55 is positioned to engage in the groove 52 and to seat in the recesses 53 and 54 to define the opposite limits to which cam 47 may be turned about its axis. The plunger 55 is reciprocably mounted in an opening 56 formed in a flattened peripheral wall portion 57 on the outer end 16 of the workholder body 12. A compression coil spring 58 is seated in the inner end of this opening and biases the plunger 55 outwardly to position the outer end of the plunger in frictional engagement with the periphery of cam 47 at the slot 52 therein.

The operation of the adjusting cam is as follows:

Normally, the cam 47 is turned to a position such that the spring pressed plunger 55 seats in the recess 53. In this position of the cam (FIG. 5) the wide straight groove 50 on the cam is positioned in the path of movement of the pins 39–42 on the arms 35–38 of the index ring 26 when the latter is turned about the workholder body 12. Slot 50 is sufficiently wide that its does not interfere with the arcuate movement of these pins.

Assuming that a pipe of nominally 1¼ inch diameter has been inserted into the axial opening in the workholder, the index ring 26 is turned to its "1¼" position. In this position of the index ring its spring-pressed ball 30 seats in the recess 33 in the central boss 17 on the workholder base 12 and its pin 40 is located at the intersecting ends of cam grooves 50 and 51, as shown in FIG. 5.

If the pipe is under-sized, the clamping jaws 22–24 will not tightly grip it. Hence the die can be easily slid over the pipe until the chasers are engaged. The cam member 47 is then turned about its trunnions 48 and 49. This causes the pin 40 on the index plate to ride along the cam groove 51, as shown in FIG. 6, until the jaws 22–24 grip the pipe. This action has resulted in a further turning of the index ring 26 from its "1¼" position to a position somewhere between its "1¼" and "1" positions. In this intermediate position of the index ring the spring-pressed ball 30 is in frictional engagement with the outer periphery of the central boss 17 on the workholder base between the recesses 33 and 34. Also, the spring-pressed plunger 55 on the workholder body 12 is in frictional engagement with the cam member 47 at the slot 52 therein between the recesses 53 and 54 at the opposite ends of this slot. These frictional engagements provide sufficient restraining force on the index ring to retain it in the intermediate position to which it has been turned.

Similar adjustments may be made at each of the other nominal settings of the index ring in case the pipe deviates from its nominal size.

The position of the ball 30 relative to each of the detents 31–34 is such that at the end of a threading operation when the cam 47 is released, the ball is not completely seated in the adjacent detent and hence being in engagement with the edge of the recess the spring pressure on the ball 30 will cause the ball to be forced into the recess and the ball in turn to force the index ring slighty further, moving the jaws to a position clear of the pipe.

Obviously, the length of the cam groove 51 and the position of recess 54 in the groove 52 in the cam member determine the amount which the index ring 26 can be turned from one of its nominal settings by means of the cam member 47. The arrangement is such that the workholder can be adjusted to grip a pipe of any size within the range from one inch in diameter to two inches in diameter.

It will be noted that the lever 47a, prior to adjustment of the jaws is so positioned that when it is rotated to tighten the jaws the pressure against the lever, by the operator, is such as to push the die onto the pipe.

From the foregoing it will be apparent that the present workholder has provision for rapidly and conveniently accommodating over-sized or under-sized pipes, without sacrificing the advantages associated with the previously used detent arrangement for setting the workholder to any one of several settings for correctly sized pipe. Moreover, because all of the jaws are coupled to the index ring and are adjusted radially simultaneously the pipe is always properly centered in the workholder.

While there has been described herein and illustrated in the accompanying drawings a particular preferred embodiment of the present workholder, it is to be understood that various modifications, omissions and refinements which depart from the specific construction of the disclosed embodiment may be adopted without departing from the spirit and scope of the present invention.

I claim:
1. An adjustable centering workholder comprising a base for receiving a work piece, adjustable workholding means on said base including work gripping jaws, an index member adjustably mounted on said base and connected to said jaws, said index member being coupled to said workholding means so that the position to which the index member is adjusted determines the setting of said work- holding means, and means to move said jaws into clamping relation with the work comprising a movable actuator means mounted on the base and operative in one position to pass the index member freely, said actuator means when moved from said one position engaging the index member to adjust the index member in response to such movement of the actuator means.

2. A device as described in claim 1 wherein the actuator comprises a cam carried by the base and the cam is provided with an operating handle so disposed that when it is moved to adjust the index member, the pressure exerted on the handle and transmitted to the base is longitudinally of the axis of the device.

3. An adjustable centering workholder comprising a base having an axial opening therein for receiving a work piece, a plurality of jaws slidably mounted on said base for adjustment radially toward and away from the axis of said opening to grip a work piece, an index member rotatably mounted on said base for adjustment angularly about the axis of said opening therein, said index member being coupled to the jaws so that the position to which the index member is turned determines the radial setting of said jaws, said index member having a projection thereon, and a movable actuator mounted on the base and operative in one position to pass said projection on the index member freely, said actuator when moved from said one position engaging said projection on the index member to turn the index member in response to such movement of the actuator.

4. An adjustable centering workholder comprising a base having an axial opening therein for receiving a work piece, a plurality of jaws slidably mounted on said base for adjustment radially toward and away from the axis of said opening, each of said jaws having a plurality of spiral groove portions therein at its front face, an index member rotatably mounted on said base for adjustment angularly about the axis of said opening therein, said index member at its rear face having spiral lands which are received in said spiral groove portions in the jaws so that the position to which the index member is turned determines the radial setting of said jaws, a cam member rotatably mounted at the periphery of said base to be turned about an axis which extends perpendicular to the axis of said opening in the base, said index member having a plurality of axial projections which are spaced apart angularly around the index member in accordance with predetermined radial settings for the jaws, said cam member in one position presenting a first peripheral groove which is positioned in the path of movement of said axial projections to pass the latter freely as the index member is turned, and said cam member presenting a second peripheral groove which intersects said first groove and extends angularly away from said first groove to receive one of said axial projections on the index member to turn the index member when said cam member is turned from said one position.

5. An adjustable centering workholder comprising a base having an axial opening therein for receiving a work piece, a plurality of jaws slidably mounted on said base for adjustment radially toward and away from the axis of said opening, each of said jaws having a plurality of spiral groove portions therein at its front face, an index ring rotatably mounted on said base for adjustment angularly about the axis of said opening therein, said index ring at its rear face having spiral lands which are received in said spiral groove portions in the jaws so that the position to which the index ring is turned determines the radial setting of said jaws, a cam member rotatably mounted at the periphery of said base to be turned about an axis which extends perpendicular to the axis of said opening in the base, said index ring having a plurality of axial projections which are spaced apart angularly around the index ring in accordance with predetermined radial settings for the jaws, said cam member in one position presenting a first peripheral groove which is positioned in the path of movement of said axial projections to pass the latter freely as the index ring is turned, said cam member presenting a second peripheral groove which intersects said first groove and extends angularly therefrom, means acting between the index ring and the base which releasably locks the index ring at each of its angular positions which correspond to said predetermined radial settings of the jaws, said index ring in each of said locked positions positioning one of said axial projections in said first groove in the cam member at the intersection of said second groove therewith, and said cam member when turned from said one position engaging said last-mentioned axial projection and forcing the latter along said second groove to turn the index ring from its locked position.

6. In a workholder comprising a base having a central axial opening for receiving a work piece, a plurality of radial passages which lead into said axial opening, and a central inner boss which projects forward beyond said radial passages, clamping jaws mounted in said radial passages and presenting spiral groove portions at their fronts, an index ring mounted rotatably on said boss and having spiral lands which are received in said spiral groove portions in the jaws so that the position to which the index ring is turned angularly on the boss determines the radial settings of the jaws, and detent means acting between the index ring and the base to releasably lock the index ring in a plurality of preselected angular positions which correspond to predetermined radial settings of the jaws, the improvement which comprises: a rotatable cylindrical cam member, means supporting said cam member adjacent the periphery of the base for rotation about an axis which extends perpendicular to the axis of said opening in the base, a plurality of axial projections on the periphery of said index ring which are positioned to pass across the length of said cam member as the index ring is turned about said boss on the base, said cam member having a lengthwise groove in its periphery which is sufficiently wide to pass said axial projections on the index ring freely in one position to said cam member as the index ring is turned, and said cam member having a cam groove in its periphery which intersects said lengthwise groove at one end and curves away therefrom about the rotational axis of the cam member and along the length of the cam member, said axial projections on the index ring being positioned at said one end of the lengthwise groove successively in said preselected angular positions in which the index ring is releasably locked on the base, and said cam member, when turned about its rotational axis after the index ring has been turned to one of said preselected angular positions, engaging the axial projection which is at said one end of the straight groove and forcing it along said cam groove to turn the index ring accordingly from said preselected position.

7. The device of claim 6, wherein there is provided means acting between the base and the cam member to frictionally retain the cam member in the position to which it has been turned.

8. In a workholder comprising a base having a central axial opening for receiving a work piece, a plurality of radial passages which lead into said axial opening, and a central inner cylindrical boss which projects forward beyond said radial passages, clamping jaws slidably mounted in said radial passages and presenting spiral groove portions at their fronts, an index ring mounted rotatably on said boss and having spiral lands which are received in said spiral groove portions in the jaws so that the position to which the index ring is turned angularly on the boss determines the radial settings of the jaws, and detent means acting between the index ring and the base to releasably lock the index ring in a plurality of preselected angular position which correspond to predetermined radial settings of the jaws, the improvement which comprises: a rotatable cylindrical cam member, means supporting said cam member adjacent the periphery of the base for rotation about an axis which extends perpendicular to the axis of said opening in the base, a plurality of axial projections on the periphery of said index ring which are positioned to pass across the length of said cam member as the index ring is turned about said boss on the base, said cam member having a lengthwise groove in its periphery which is sufficiently wide to pass said axial projections on the index ring freely as the index ring is turned in one position of said cam member, and said cam member having a cam groove in its periphery which intersects said lengthwise groove at one end of the cam member and curves away therefrom about the rotational axis of the cam member and along the length of the cam member, said axial projections on the index ring being positioned at said one end of the lengthwise groove successively in said preselected angular positions in which the index ring is releasably locked on the base, said cam member, when turned about its rotational axis after the index ring has been turned to one of said preselected angular positions, engaging the axial projection which is at said one end of the straight groove and forcing it along said cam groove to turn the index ring accordingly from said preselected position, said cam member at its opposite end having a circumferential groove in its periphery which extends from one side of the straight groove across the straight groove and terminates short of the opposite end of the cam groove, a spring-pressed plunger mounted at the periphery of the base and biased outward therefrom into engagement with the cam member at said circumferential groove therein, said cam member being formed with depressions at opposite ends of said circumferential groove which define the opposite limiting positions to which the cam member may be turned, one of said depressions being located to said one side of the straight groove and said spring-pressed plunger seating in said one depression in said one position of the cam member.

9. The workholder of claim 8 wherein each of said jaws at its inner end presents a pair of spaced sets of inwardly projecting teeth, with the respective sets of teeth on each jaw being spaced apart angularly around the axis of said axial opening in the base and the teeth of each set being spaced apart axially from each other, and each tooth presents an inner edge for substantially line contact with the work piece.

10. An adjustable centering workholder comprising a base for receiving a work piece, adjustable workholding means on said base, an index member mounted on said base to be turned to various angular positions thereon, said index member being coupled to said workholding means so that the position to which the index member is turned determines the setting of said workholding means, said index member having a plurality of projections which are spaced apart around the index member in accordance with predetermined settings for said workholding means, a cam member rotatably mounted on the base, said cam member in one position presenting a first peripheral groove which is positioned in the path of movement of said projections to pass the latter freely as the index member is turned, said cam member presenting a second peripheral groove which intersects said first groove and extends angularly therefrom, detent means acting between the index member and the base which releasably locks the index member at each of its angular positions which correspond to said predetermined settings for said work holding means, said index member in each of said locked positions positioning one of said projections in said first groove in the cam member at the intersection of said second groove therewith, and said cam member when turned from said one position engaging said last-mentioned axial projection and forcing the latter along the second groove to turn the index member from its locked position.

11. The workholder of claim 10, wherein there is provided a spring-pressed member acting between the base and the index member to frictionally retain the cam member in the position to which it has been turned.

12. An adjustable centering workholder comprising a base for receiving a work piece, adjustable workholding means on said base, an index member mounted on said base to be turned to various angular positions thereon, said index member being coupled to said workholding means to determine the setting of said workholding means in accordance with the angular position to which the index member is turned, and a rotatable cam member mounted on the base in the path of movement of said index member, said cam member in one angular position about its axis of rotation passing the index member freely to permit the index member to be turned on the base, and said cam member when turned about its axis of rotation from said one position engaging the index member and turning the index member on the base as the cam member is turned.

13. An adjustable centering workholder comprising a base having a central axial opening for receiving a work piece, a plurality of radial passages which lead into said axial opening, and a central inner boss which projects forward beyond said radial passages, clamping jaws slidably mounted in said radial passages and presenting spiral groove portions at their fronts, an index ring mounted rotatably on said boss and having spiral lands which are received in said spiral groove portions in the jaws so that the angular position to which the index ring is turned on the boss determines the radial settings of the jaws, detent means acting between the index ring and the base to releasably lock the index ring in a plurality of preselected angular positions which correspond to predetermined radial settings of the jaws, and a rotatable cam member mounted on the base in the path of movement of the index ring, said cam member in one angular position about its rotational axis passing the index ring freely to permit the index ring to be turned on the base, and said cam member when turned about its rotational axis from said one position engaging the index ring and turning the index ring on the base as the cam member is turned.

14. A workholder comprising a base having an axial opening for receiving a work piece and a plurality of radial passages which lead into said openings, clamping jaws slidably disposed in said radial passages and at their inner ends projecting into said axial opening in the base, each of said jaws at its inner end presenting a pair of spaced sets of inwardly projecting teeth, with the respective sets of teeth on each jaw being spaced apart angularly about the axis of said opening and the teeth in each set being spaced apart axially from each other, each tooth presenting an inner edge for substantially line contact with the work piece, each of said teeth having an end face which extends from the axially inward end of said inner edge of the tooth substantially perpendicular to the axis of said axial opening in the base, each of said teeth having an end face which is inclined radially and axially outward from the opposite end of said inner edge of the tooth, and means for selectively positioning the jaws radially with respect to the axis of said axial opening in the base.

15. In an adjustable centering workholder having adjustable workholding means, and an angularly adjustable index member coupled to said workholding means to adjust the latter's setting depending upon the angular position to which said index member is turned, the improvement which comprises: a rotatable cam member, a plurality of projections on said index member at spaced angular locations thereon corresponding to predetermined settings of said workholding means, said projections being positioned to pass successively across said cam member as said index member is turned, said cam member having a first groove in its periphery which in one rotational position of the cam member passes said projections freely as the index member is turned, and said cam member having a cam groove in its periphery which intersects said first groove and extends angularly therefrom, said projections on the index member being positioned at the intersection of said first groove and said cam groove in the cam member successively in the angular positions to which the index member is turned for said predetermined settings of said workholding means, and said cam member, when turned after the index member has been turned to one of said positions, engaging the projection on the index member which is at said intersection and forcing said projection along the cam groove to turn the index member accordingly from said last-mentioned position.

16. In an adjustable centering workholder having a base with an axial opening for receiving a work piece, adjustable workholding means on said base for holding the work piece at said axial opening and an index member mounted on said base to be turned about said axial opening to various angular positions on the base, said index member being coupled to said workholding means so that the angular position to which the index member is turned determines the setting of said workholding means, the improvement which comprises: a plurality of axial projections on said index member which are spaced apart angularly around the index member in accordance with predetermined settings for said workholding means, a rotatable cam member, and means supporting said cam member for rotation about an axis which extends substantially perpendicular to the axis of said opening in the base, said cam member being disposed in the path of movement of said projections on the index member as the latter is turned, said cam member having a lengthwise groove in its periphery which is sufficiently wide to pass said projections freely as said index member is turned in one position of said cam member about its axis of rotation, and said cam member having a cam groove in its periphery which intersects asid lengthwise groove and curves away therefrom about the rotational axis of the cam member and along the length of the cam member, said projections on the index member being positioned at the intersection of said lengthwise groove and said cam groove in the cam member successively in the respective positions to which the index member is turned for said predetermined settings of the workholding means, said cam member, when turned about its rotational axis after the index member has been turned to one of said positions, engaging the projection on the index member which is at said intersection and forcing said projection along the cam groove to turn the index member accordingly from said last-mentioned position.

17. In an adjustable centering workholder having a base with an axial opening therein for receiving a work piece, a plurality of jaws mounted on the base for adjustment radially toward and away from the axis of said opening, and an index member rotatably mounted on said base to be turned about the axis of said opening and coupled to said jaws so that the angular position to which the index member is turned determines the radial setting of said jaws, the improvement which comprises: a cam member rotatably mounted on said base to be turned about an axis which extends perpendicular to the axis of said opening in the base, a plurality of axial projections on the index member which are spaced apart angularly about the index member in accordance with predetermined radial settings for the jaws, said cam member in one position presenting a first peripheral groove which is positioned in the path of movement of said projections and which passes the latter freely as the index member is turned, and said cam member presenting a second peripheral groove which intersects said first groove and extends angularly away from said first groove to receive one of said projections on the index member to turn the index member when said cam member is turned from said one position.

References Cited in the file of this patent

UNITED STATES PATENTS

| | | |
|---|---|---|
| 990,864 | Hart | May 2, 1911 |
| 1,295,412 | Baines | Feb. 25, 1919 |
| 1,594,716 | Forkardt | Aug. 3, 1926 |
| 1,795,604 | Hyde | Mar. 10, 1931 |
| 1,844,616 | Whiton | Feb. 9, 1932 |
| 1,973,232 | Thewes | Sept. 11, 1934 |
| 2,200,927 | Lilleberg | May 14, 1940 |
| 2,854,216 | Bjalme | Sept. 30, 1958 |